United States Patent
Burdick

(10) Patent No.: US 7,735,412 B2
(45) Date of Patent: Jun. 15, 2010

(54) APPARATUS FOR DISTRIBUTED PRODUCTION OF BEER

(75) Inventor: William E. Burdick, Minnetonka, MN (US)

(73) Assignee: Granite City Food and Brewery, Ltd., Minneapolis, MN (US)

(*) Notice: Subject to any disclaimer, the term of this patent is extended or adjusted under 35 U.S.C. 154(b) by 394 days.

(21) Appl. No.: 11/800,753

(22) Filed: May 7, 2007

(65) Prior Publication Data

US 2007/0214965 A1    Sep. 20, 2007

Related U.S. Application Data

(63) Continuation of application No. 10/411,002, filed on Apr. 9, 2003, now Pat. No. 7,214,402, which is a continuation-in-part of application No. 09/777,159, filed on Feb. 5, 2001, now abandoned.

(60) Provisional application No. 60/238,606, filed on Oct. 10, 2000.

(51) Int. Cl.
C12C 11/00 (2006.01)
C12C 7/06 (2006.01)
C12G 1/02 (2006.01)

(52) U.S. Cl. .............. 99/276; 99/277; 99/278

(58) Field of Classification Search .......... 99/276, 99/277, 277.1, 277.2, 278; 62/133, 239, 62/244; 165/41
See application file for complete search history.

(56) References Cited

U.S. PATENT DOCUMENTS

| | | | |
|---|---|---|---|
| 2,244,524 A | 6/1941 | Lima | |
| 3,290,153 A | 12/1966 | Bayne, et al. | |
| 3,361,569 A | 1/1968 | Malick | |
| 3,361,570 A | 1/1968 | Malick | |
| 3,875,303 A | 4/1975 | Hieber | |
| 4,305,963 A | 12/1981 | Nakagawa | |
| 4,418,092 A | 11/1983 | Blackwell | |
| 4,569,292 A * | 2/1986 | Dunham et al. | 105/358 |
| 4,591,064 A * | 5/1986 | Gerhard | 220/1.5 |
| 4,810,505 A | 3/1989 | Pachemegg | |
| 4,943,436 A | 7/1990 | Ogden | |
| 4,957,767 A | 9/1990 | Maria de Kort et al. | |
| 5,718,161 A * | 2/1998 | Beadle | 99/276 |
| 5,869,114 A * | 2/1999 | Murray et al. | 426/11 |
| 5,925,563 A * | 7/1999 | Redford | 435/300.1 |
| 6,033,690 A | 3/2000 | Austin et al. | |

FOREIGN PATENT DOCUMENTS

JP    1-109138    *    1/1989

OTHER PUBLICATIONS

Homebrew Digest #2532, http://hbd.org/archive/2532.html, Oct. 16, 1997.

(Continued)

Primary Examiner—Reginald L Alexander
(74) Attorney, Agent, or Firm—Gerald E. Helget; Nelson R. Capes; Briggs and Morgan, P.A.

(57) ABSTRACT

A commercial multiple barrel beer brewing apparatus includes a brew kettle at a first location; a hopped wort holding vessel; a chiller for chilling the hopped wort stored in the holding vessel to a temperature range of approximately 29° F. to 40° F.; a transportation vessel on a vehicle to transport chilled hopped wort to a brew pub; a first conduit between the chilled hopped wort holding vessel and the transportation vessel; a fermentation vessel located a brew pub; and a second conduit between the transportation vessel and the fermentation vessel.

10 Claims, 2 Drawing Sheets

OTHER PUBLICATIONS

Dr. Trudy Wassenaar, Yeast and Temperature, Newton Jan. 11, 2001. http://www.newton.dep.anl.gov/askasci/bio99/bio99693.htm Date obtained from http://web.archive.org.

Benedik, Michael, MadSci Network: General Biology Jan. 30, 2001. http://www.madsci.org/posts/archives/jan2001/890908832.Gb.r.html.

* cited by examiner

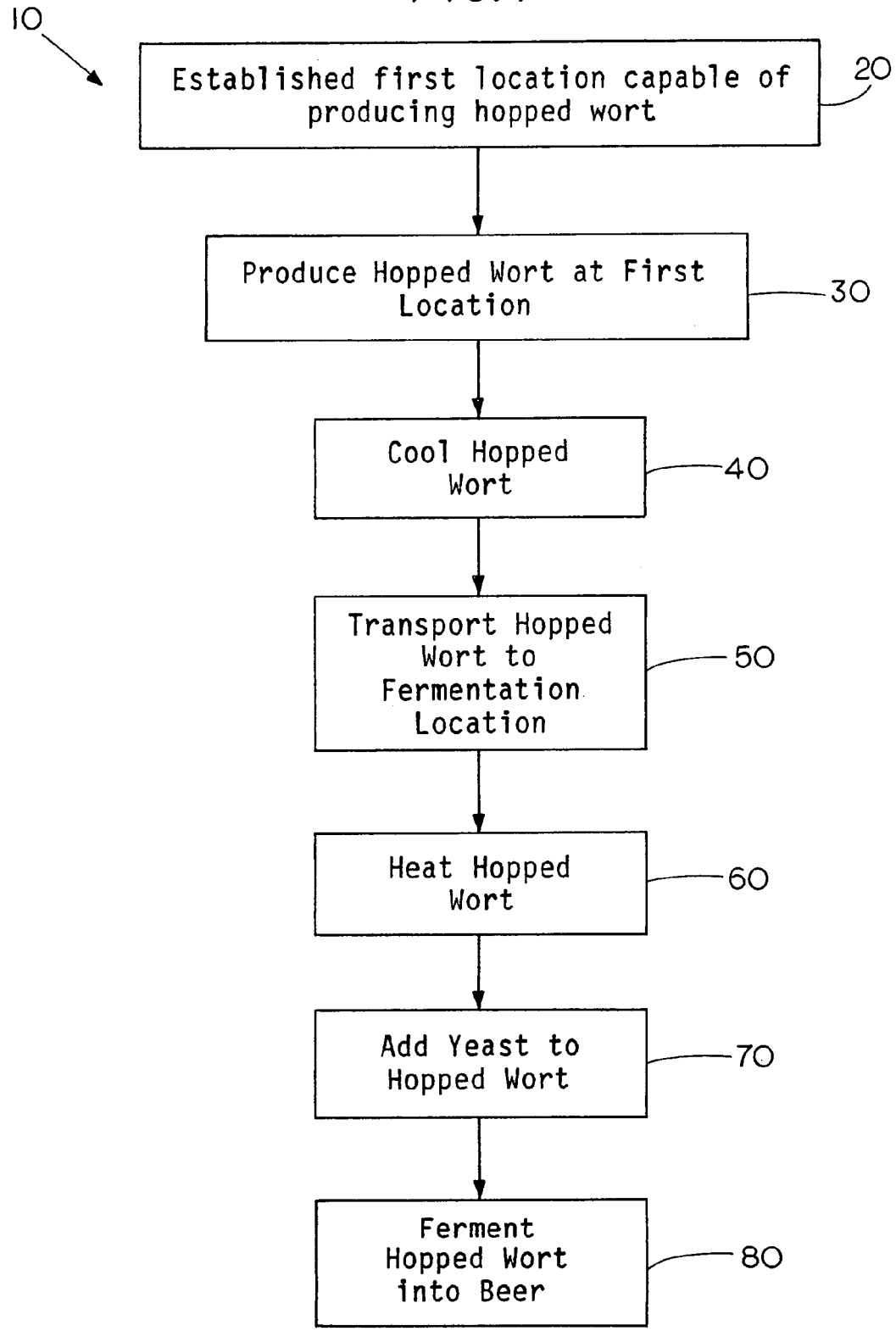

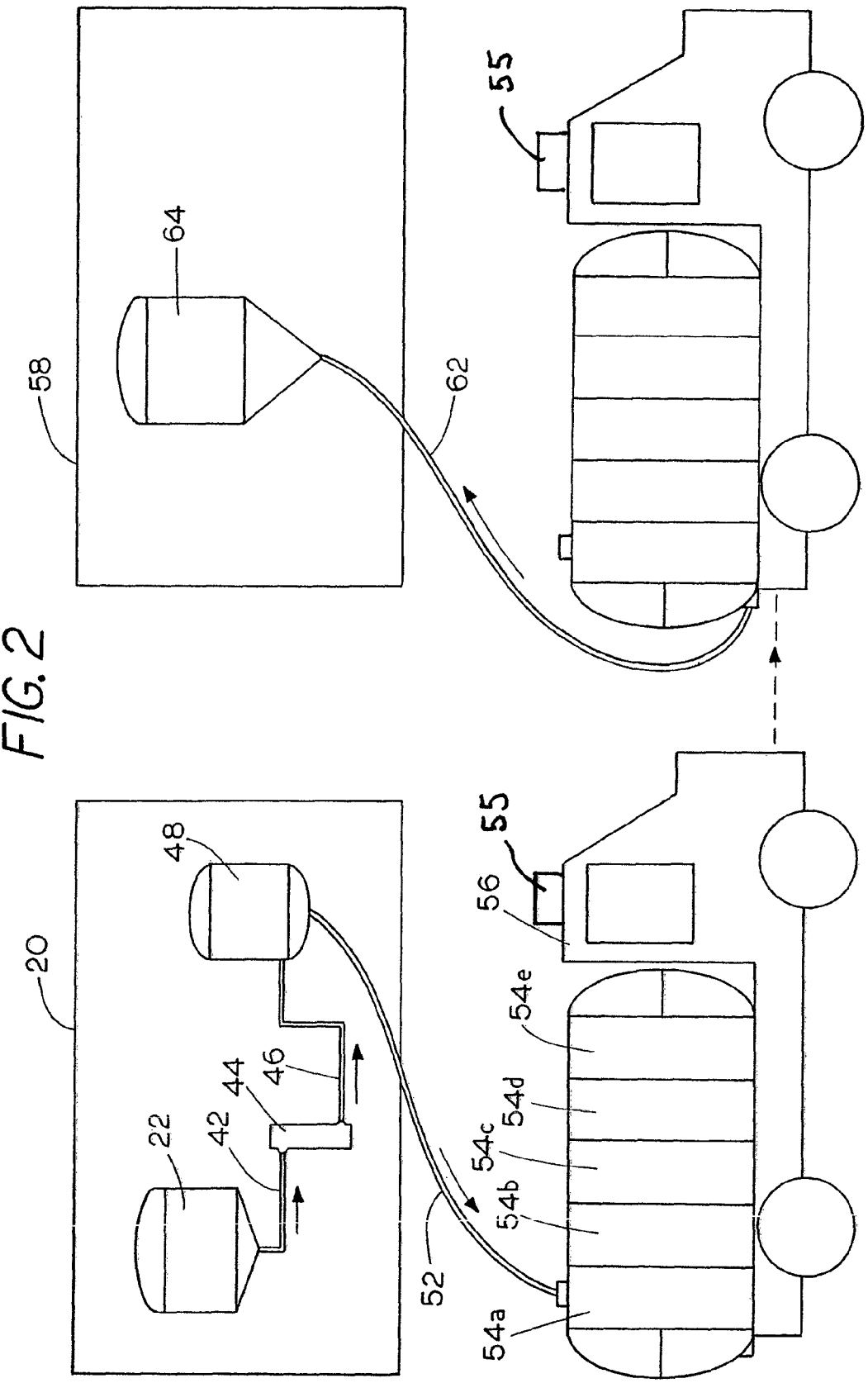

APPARATUS FOR DISTRIBUTED PRODUCTION OF BEER

CROSS-REFERENCE TO RELATED APPLICATIONS

The present application is a continuation of and claims priority of U.S. patent application Ser. No. 10/411,002, filed Apr. 9, 2003 now U.S. Pat. 7,214,402, which is a continuation-in-part of U.S. patent application Ser. No. 09/777,159, filed Feb. 5, 2001 now abandoned and which is based on U.S. provisional patent application Ser. No. 60/238,606, filed Oct. 10, 2000. The content of these is hereby incorporated by reference in their entirety.

FIELD OF THE INVENTION

The present invention relates to the commercial multi-barrel production of beer and the provision of restaurant services, more particularly, to the commercial production of hopped wort, transportation of the hopped wort to restaurant locations remote from the production site, and the fermentation of the hopped wort into beer at the restaurant site.

BACKGROUND OF THE INVENTION

The production of beer is old in the human arts, with some historians and anthropologists of the belief that it was the need to produce grain to ferment into beer that led to the establishment of civilization thousands of years ago.

In very general terms, the production of beer involves first producing a "sweet wort." The sweet wort is formed by the addition of water to malted and unmalted crushed grain such as, but not limited to, barley to form a slurry or mash in a mash tun. Through the action of naturally occurring enzymes this mash is then converted into the sweet wort. Subsequently, the liquid in the sweet wort is drained from the mash tun and directed to a brew kettle where hops are added. The hopped liquid is then boiled in the brew kettle to produce a "hopped wort." The final step in the brewing process involves the addition of a yeast to cause fermentation to occur in a fermentation vessel, which in turn results in the production of alcohol.

Over the years, the foregoing general process has been tinkered with and altered by brewmasters to produce beers of differing flavors, coloring, clarity, and alcohol content. Differing pressures, temperatures, grains, yeasts, and fermentation times produce differing beers, which is inclusive of ales and lagers.

Along with the rise in the production and sale of fermented beverages came eventually the provision of restaurant services. The basic methods of providing restaurant services, including the sale of alcoholic beverages, has changed little in substance, though perhaps greatly in style, over the centuries.

Many restaurants, though not all, serve alcoholic beverages, including beers. Restaurants generally provide their customers with beer by purchasing finished product produced at a brewery, which is then shipped to a restaurant for sale, or, in a few instances, by producing the beer on site at the restaurant. The latter form of restaurant establishments are known as "brew-pubs" in the industry. In reality, the vast majority of beer is brewed by the major breweries and then transported to various restaurants and served either in individual containers or out of kegs.

Some restaurants have made the large capital expenditures necessary to brew beer from start to finish on site, though their numbers are limited because of the cost involved in purchasing, operating, and maintaining a quality beer production facility in a restaurant. In addition, those restaurants that have made this investment find expansion difficult to achieve for several reasons, not the least of them being because of the cost involved in building new brewing facilities at a new location and the lack of skilled brewmasters to oversee the brewing process in the individual restaurants. Consequently, often times a successful restaurant offering on-site brewing as well as other restaurant services is unable to expand beyond a single restaurant because of the capital cost involved with establishing another on-site brewery and/or the lack of a brew master to oversee the brewing operation.

Another difficulty faced by brew-pubs in expanding their operations from a single site is that the quality of beer produced at varying locations can differ for a number of reasons, most prominent of them being the quality of water used to produce the beer at each site. That is, because water quality naturally varies from site to site, it is difficult—if not nearly impossible—and costly to produce a beer of the exact same taste and quality from brew-pub to brew-pub without costly processing of the local water at multiple location so as to remove it as a factor in the quality of the final product produced at each location.

Some brew-pubs have perhaps considered a central location for the production of all of their brewed product with shipment of the finished product from the central production facility to other locations, thus avoiding the issue of the large capital costs involved in setting up second and subsequent brewing facilities. A considerable difficulty of this approach, however, is the regulatory morass involved in the production and transport of alcoholic beverages in intrastate and interstate commerce.

The prior art discloses an interruption in the brewing process in U.S. Pat. No. 3,290,153 to Bayne, et al. In that patent, the brewing process is discontinued after the production of the hopped wort. The hopped wort is then concentrated by passing it through continuous film evaporators or boiling away water under high pressure to produce a wort concentrate having a solids content of about 80%. Following concentration, the wort is cooled to a temperature below 105° F. The patent then notes that the wort concentrate can be stored on site or shipped elsewhere for subsequent reconstitution and fermentation. It is unclear whether this method was ever actually implemented, but in any event, this production method is rife with difficulty, however, not the least of which is that the taste, color, etc. of beer is greatly dependent upon the quality of water used in the production of the final product. Thus, the production of beer at a different location from where the wort was originally produced using this process is subject to the production of beer of varying quality and taste at the various final production facilities or to great cost to neutralize the effect of the local water quality. In addition, the cost of producing the wort concentrate is itself expensive in that it requires multiple evaporators or equivalent equipment to produce the concentrated wort.

Another inquiry into interruption of the brewing process after production of the hopped wort is found in Homebrew Digest (http//:hbd.org/hbd/archive/2532). There, an amateur brewer questions whether it might be possible to store a small amount of wort after boiling and chilling in order to sell the stored wort to customers at a local home brew store. It is clear from the disclosure that the process had not been implemented. There are no process steps disclosed nor is any apparatus discussed. The nature of the disclosure, however, indicates that storage of small amounts of wort is contemplated with a very short transport to a "local" home brew store for subsequent storage and sale. Complications also make the proposed process non-functional for home brew stores. For instance, Department of Health regulations and inspections would greatly hamper, if not prohibit, this small scale process. The disclosure does not contemplate the commercial production of multiple barrels of wort and subsequent transportation of the wort to multiple and remote restaurant sites where fermentation occurs according to established and controlled parameters.

It is desirable to have a process and associated apparatus for the interruption of the brewing process after production of commercial volumes of unfermented hopped wort, placing the wort under storage conditions that substantially inhibit bacterial action, transporting the wort under controlled conditions to several remote locations, offloading the wort at each location under controlled conditions, and fermenting the wort at each location according to established procedures to produce a beer of singular taste and quality, ensuring that each brew is essentially indistinguishable from the first location where the hopped wort is made to each second location to which the hopped wort is transported and fermented.

SUMMARY OF THE INVENTION

The present invention calls for the establishment of a centralized facility for the production of unfermented, undiluted, and unprocessed hopped wort using a single source of water. The hopped wort is then cooled and transported to a plurality of remote fermentation sites where the hopped wort will be fermented into beer by the addition of yeast. The fermentation sites are preferably located within a restaurant to provide the diners with the aesthetic enjoyment of consuming beers fermented on the premises and to provide a consistent quality from one restaurant location to the next where such beers are produced.

It is an object and advantage of the present invention to provide a new and improved method and apparatus for production of multiple barrels of beer production that is not subject to the foregoing disadvantages.

It is another object and advantage of the present invention to provide a method and apparatus for achieving a quality beer product that is produced in commercial quantities and is finish brewed at a plurality of restaurant locations at a favorable cost of production.

It is still another object and advantage of the present invention to provide a method and apparatus for production of a quality beer product in commercial quantities and originally brewed on-site at a plurality of locations using a single source for the production of the hopped wort.

It is yet another object and advantage of the present invention to provide a method and apparatus for a brew pub to produce commercial quantities of a quality beer product at a plurality of locations without incurring full infrastructure costs for beer production at each location.

It is still yet another object and advantage of the present invention to enable a brew-pub chain to produce a beer, of singular quality, at commercial volumes, at each of its restaurants.

It is yet another object and advantage of the present invention to enable a brew-pub chain to produce a beer of singular quality at each of its restaurants, at commercial volumes, without regard to local variations in water quality used in the production of beer.

It is another object and advantage of the present invention to provide a commercial method and apparatus for a brew pub to expand from a single location to one or more additional locations while still being able to produce and sell beer brewed on site without sacrificing quality in the brewed product and without being subject to various state and federal regulations regarding the production and shipment of alcoholic beverages.

The foregoing objects and advantages of the present invention are provided by a method and apparatus for distributed restaurant services and beer production. The present invention provides for establishing a first of a plurality of restaurants with the first restaurant including the necessary equipment to brew beer from start to finish and being generally capable of producing more hopped wort than the first restaurant necessarily needs, presuming normal patronage, for fermenting into beer for on-site sales. The excess capacity hopped wort is cooled and then the unconcentrated, unadulterated hopped wort is transported under controlled conditions to inhibit bacterial growth and to eliminate the necessity of using chemical preservatives, to at least a second restaurant where the hopped wort is placed within a fermentation vessel for the addition of yeast to begin and complete the fermentation process.

More generally, the present invention calls for the establishment of a centralized facility for the commercial production of multiple barrels of unfermented, undiluted, and unprocessed hopped wort using a single source of water. This hopped wort is then cooled and transported to a plurality of remote fermentation sites where the hopped wort will be fermented into beer by the addition of yeast. The fermentation sites are preferably located within a restaurant to provide the restaurant customers with the aesthetic enjoyment of consuming beers fermented on the premises and to provide a consistent quality from one restaurant location to the next where such beers are produced.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 1 illustrates a flow chart showing a method for the production of beer in accord with the present invention.

FIG. 2 illustrates, by block diagram, equipment used for the production of beer in accord with the present invention.

DETAILED DESCRIPTION OF THE INVENTION

The method of the present invention as shown in FIGS. 1 and 2 provides for a discontinuation of the brewing process after the production of commercial volumes of the hopped wort. The general steps for the production of beer are well known. In very general terms, the production of beer involves first producing a "sweet wort." The sweet wort is formed by the addition of water to malted and unmalted crushed grain such as, but not limited to, barley to form a slurry or mash in a mash tun. Through the action of naturally occurring enzymes this mash is then converted into the sweet wort. Subsequently, the liquid in the sweet wort is drained from the mash tun and directed to a brew kettle where hops are added. The hopped liquid is then boiled at approximately 212° F. in the brew kettle to produce a "hopped wort." After boiling, the temperature must be reduced to the desired fermentation temperature. The fermentation temperature differs for lagers and ales. Lagers may ferment at approximately 50° F. Ales may ferment at a warmer temperature of approximately 70° F. Once the desired fermentation temperature is reached, the final step in the brewing process involves the addition of a yeast to cause fermentation to occur in a fermentation vessel, which in turn results in the production of alcohol.

The present invention differs from the normal brewery model in which the hopped wort is transferred directly to a fermentation vessel where the hopped wort is allowed to cool from the boiling temperature, approximately 212° F., to the fermentation temperature, typically a range of 50° F. to 70° F., the yeast pitched and fermentation allowed to commence. In contrast, the present invention involves an interruption in the brewing cycle after the boiling of hopped wort. The hopped wort is chilled to the temperature range of 29° F. to 40° F. for subsequent transport and/or storage, in contrast to the normal model which cools the wort from 212° F. to approximately 50° F. to 70° F. for fermentation without any interventing transport or storage. Another significant difference from the prior art is that the inventive process allows for transport of the stored, chilled hopped wort to remote locations where the wort is quickly heated to the desired fermentation temperature and fermentation allowed to commence. This requires quick heating of the wort, stored at 29° F. to 40° F., to a range of 50° F. to 70° F. depending on whether the resultant beer is a lager or an ale.

Finally, the amounts that can be produced by the inventive process are commercial quantities. The commercial beer industry refers to beer production by the barrel, with each barrel being the equivalent of 31 gallons. Using the present invention, a typical volume of unfermented hopped wort for a particular type of beer produced at a first location and then transported for fermentation at a second location is in the range of 250 to 400 gallons (approximately 8 to 13 barrels) of wort per beer type. As indicated in FIG. 2, the wort transporter or vehicle may contain at least one distinct wort transportation vessel and as many as five or more transportation vessels, the number being limited only by the size and configuration of the truck or trailer. In the preferred embodiment, each transportation vessel has a capacity of 250 gallons, for an aggregate transportation vessel capacity of at least 1,250 gallons or approximately 40 barrels of wort when five transportation vessels are used.

The present invention also provides a method for providing distributed restaurant services including the service of fermented-on-site beers. In a method in accord with the present invention, a centralized hopped wort production facility is established, which may be within an established restaurant. Multiple barrels of a hopped wort is produced at the centralized facility and then cooled and transported to remote restaurant sites providing restaurant services comprising serving food and beverages including beer. The appropriate yeast will then be added to the rewarmed hopped wort at the remote restaurant site and the hopped wort will be fermented into beer.

With reference now to FIG. 1, the present invention will be described in detail, FIG. 1 illustrates a process flowchart for method 10 for the distributed production of a quality beer product that is substantially independent of the quality of the local water source at the secondary production facilities. Method 10 contemplates establishing a first production facility as indicated at 20, such as a restaurant providing restaurant services, with the facility including the necessary and well-known equipment for the production of beer from start to finish. Additionally, the first production facility 20 will be able to produce hopped wort at a capacity over and above what would normally be expected to be fermented into beer and sold on the premises. The present invention contemplates that the production of the hopped wort will be carried out in the normal course of beer production at the first facility 20 as indicated at 30, preferably under the direction of a skilled brewmaster. As indicated at 40, upon completion of the boil of the hopped wort, the hopped wort will be chilled from its boiling temperature of approximately 212° F. to between 29° F. and 40° F. preferably to about 36° F., as suggested by the United States Department of Agriculture.

When the hopped wort has been cooled, it is then transported as indicated at 50, to a fermentation location that is remote from the hopped wort production site 20. At the fermentation location, the chilled hopped wort is heated as shown at 60, yeast pitched as indicated at 70 and fermentation allowed to commence 80.

With reference now to FIGS. 1 and 2, the inventive method will now be examined with regard to the particular equipment used. Once a batch of hopped wort has been produced in the brew kettle 22, a preselected amount of the hopped wort batch can be drawn off and quickly cooled from its boiling point to a temperature below which microbial activity can normally be expected to occur, that is, within the range of between 29° F. and 40° F., and preferably about 36° F., as indicated at 40. The inventive method requires that the hopped wort be cooled from 212° F. to within the range of 29° F. to 40° F. for storage and transport, as opposed to the normal brewery model's fermentation temperature of in a range of approximately 50° F. to 70° F. It will be understood that the production of the hopped wort, which involves boiling, will destroy most microbes present in the hopped liquid prior to boiling. By rapidly cooling the hopped wort, microbial production is slowed if not completely prevented, during storage and transport to the fermentation facility 58 located remotely from the hopped wort production site 20.

The hot wort can be cooled as indicated at 40 in any known manner useful for chilling hot fluids. FIG. 2 illustrates the preferred chiller which employs a heat exchanger 44 that is in flow communication with a first conduit 42 from the brew kettle 22. The heat exchanger 44 cools the hopped wort from approximately 212° F. to within the range of 29° F. to 40° F. The chilled wort is then transferred through a second conduit 46 that is in flow communication with the chilled wort holding vessel 48. Several chilling methods are available. For example, the output lines from the brew kettle 22 may be jacketed with a cooling sheath. Alternatively, the hopped wort could be transferred to an appropriately designed cooling vessel known in the art for cooling to the desired temperature range.

Once cooled, the unfermented hopped wort may be held within the desired temperature range in the chilled wort holding vessel 48 until transfer of the wort to a transportation vessel, shown as 54a-54e, which is located on the wort transporter or vehicle 56 as indicated in FIG. 2. The transfer of the wort may be accomplished by a number of mechanisms. Preferably, an air compressor, not shown in the Figures, is used to force the wort out of the wort holding vessel 48 through a first conduit 52 that is in flow communication between the wort holding vessel 48 and the individual transportation vessels 54a-54e. The use of compressed air as a propellant is permissible in the inventive process because the unfermented chilled wort is in an aerobic state and is unaffected by air as a result. The use of compressed air also allows for rapid transfer of the multiple barrel amounts contemplated by the present invention. Other methods may be used to assist in the transfer of the hopped wort into the transportation vessel 56 including, but not limited to, the use of gravity, vacuums, and pumps.

The hopped wort can then be transported as indicated at 50 to a remote or distributed site. Typically the transportation vessels 54a-54e used in liquid transport are insulated, preventing substantial temperature changes in the fluid. Thus, if the fermentation facility 58 for which the hopped wort is destined nearby, further efforts to maintain the temperature of the hopped wort within the range of between 29° F. and 40° F. may be unnecessary. Where, however, the wort is to be transported a considerable distance, or, where environmental factors such as the ambient temperature would so indicate, the transportation vessels 54a-54e could also have chilling units 55 thereon as in any known manner so as to maintain the hopped wort within the acceptable transport temperature range.

As shown in FIG. 2, the wort transporter 56 is preferably equipped with a plurality of transportation vessels 54a-54e, each vessel being capable of housing commercial volumes of hopped wort during transport. In the preferred embodiment, the wort transporter 56 is comprised of 5 individual transportation vessels 54, each having a capacity of approximately 250 gallons or approximately 8 barrels of wort. Each transportation vessel 54a-54e is further preferably equipped with individually temperature-controlled chilling units to allow individualized temperature control of each type of hopped wort. The transportation vessels 54a-54e are sanitized prior to transferring the hopped wort using well known procedures and either chlorine or iodine as the sanitization agent.

Following the arrival of the hopped wort at the fermentation facility 58, which may be another restaurant as previously noted, the chilled hopped wort will be offloaded from the transport vessel 54a-54e through a second conduit 62 in flow communication between the transport vessel 54a-54e and the fermentation vessel 64 where the temperature is increased from the range of 29° F. to 40° F. to approximately 70° F. for fermentation, the yeast pitched and fermentation allowed to commence.

Following the normal fermentation for the particular type of beer desired to be produced, the newly on-site-produced beer is aged in maturation vessels and then is served to the restaurant's customers. Because there is no or very little local water that would need to be added during the fermentation process, the present invention of providing restaurant services is essentially independent of local water quality and thus the beer finally produced at the remote locations 58 will have substantially the same taste and color and be of the same quality as that produced at the production facility which produced the hopped wort.

The present invention enables a restaurateur to expand the number of restaurant sites that offer a particular decor, menu, and on-site brewed beverages of identical taste and quality while reducing the amount of capital involved to do so and the need to rely on a skilled brewmaster at each location where the beverages are fermented. That is, with the present invention, a single brewmaster can maintain control of the production of the hopped wort at the central facility as well as individually oversee or properly train employees to oversee the fermentation process at the individual restaurants where the fermentation takes place. In addition, because the hopped wort does not contain alcohol, the production and transport of the hopped wort does not implicate state and federal laws and regulations regarding the production, sale, and distribution of alcoholic beverages, thus eliminating administrative and legal costs associated with compliance with those lavas and regulations.

More generally still, the present invention provides a new method of producing beer comprising, first, cooling a commercial quantity of hopped wort produced at a first location, which could be a centralized production facility, to a temperature in the range of 29° F. to 40° F.; second, transporting the unconcentrated, unadulterated hopped wort to a second location remote from the first location, the second location being a brewpub, restaurant, bar, or any other establishment capable of fermenting the hopped wort into beer; and, third, fermenting the hopped wort into beer at the second location. The present invention is distinct over the prior art techniques of producing beer in that the prior art beer production process is interrupted before the yeast is added to the hopped wort and instead the hopped wort is first transported to a second location remote from the first in any known manner, such as by trucks having refrigerated vessels for fluid transport and then the yeast is subsequently added at a new fermentation location.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A commercial multiple barrel beer brewing apparatus, comprising:
   (a) a brew kettle located at a first location for converting sweet wort to unconcentrated hopped wort by adding hops and boiling the sweet wort in the brew kettle, wherein the brew kettle has a capacity of at least 8 to 13 barrels;
   (b) a hopped wort holding vessel in fluid communication with the brew kettle for holding unconcentrated hopped wort at a temperature range of approximately 29° F. to 40° F., wherein the holding vessel has a capacity of at least 8 to 13 barrels;
   (c) a chiller between the brew kettle and the unconcentrated hopped wort holding vessel for chilling the boiled unconcentrated hopped wort to be stored in the holding vessel to a temperature range of approximately 29° F. to 40° F.;
   (d) a transportation vessel integrally mounted on a vehicle to transport chilled unconcentrated hopped wort to a brew pub;
   (e) a first conduit in flow communication between the chilled unconcentrated hopped wort holding vessel and the transportation vessel for transporting the chilled unconcentrated hopped wort from the holding vessel to the transportation vessel;
   (f) a fermentation vessel located at the brew pub; and
   (g) a second conduit in flow communication between the transportation vessel and the fermentation vessel for transporting the chilled unconcentrated hopped wort from the transportation vessel to the fermentation vessel, whereat the temperature is increased, yeast is pitched and fermentation is allowed to commence.

2. The apparatus of claim 1, wherein the transportation vessel is refrigerated.

3. The apparatus of claim 1, further comprising a plurality of transportation vessels on the vehicle.

4. The apparatus of claim 3, wherein each transportation vessel has a capacity of approximately 8 barrels of wort.

5. The apparatus of claim 3, wherein each of the plurality of transportation vessels further comprises a temperature-controlled chilling unit.

6. A commercial multiple barrel beer brewing apparatus, comprising:
   (a) a brew kettle located at a first location for converting sweet wort to unconcentrated hopped wort by adding hops and boiling the sweet wort in the brew kettle, wherein the brew kettle has a capacity of at least 8 to 13 barrels;
   (b) a chiller connected to the brew kettle for receiving and chilling the boiled unconcentrated hopped wort from the brew kettle to a temperature range of approximately 29° F. to 40° F.;
   (c) a transportation vessel integrally mounted on a vehicle to transport chilled unconcentrated hopped wort to a brew pub;
   (d) a first conduit in flow communication between the chiller and the transportation vessel for transporting the chilled unconcentrated hopped wort from the chiller to the transportation vessel;
   (e) a fermentation vessel located at the brew; and
   (f) a second conduit in flow communication between the transportation vessel and the fermentation vessel for transporting the chilled unconcentrated hopped wort from the transportation vessel to the fermentation vessel, whereat the temperature is increased, yeast is pitched and fermentation is allowed to commence.

7. The apparatus of claim 6, wherein the transportation vessel is refrigerated.

8. The apparatus of claim 6, further comprising a plurality of transportation vessels on the vehicle.

9. The apparatus of claim 6, wherein the transportation vessel has a capacity of approximately 8 barrels of wort.

10. The apparatus of claim 8, wherein each of the plurality of transportation vessels further comprises a temperature-controlled chilling unit.

* * * * *